W. KAISLING.
CALLING DEVICE.
APPLICATION FILED JULY 9, 1910.
1,096,841.
Patented May 19, 1914.
3 SHEETS—SHEET 1.
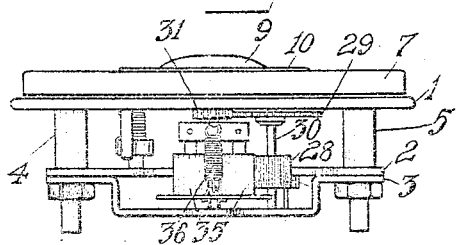
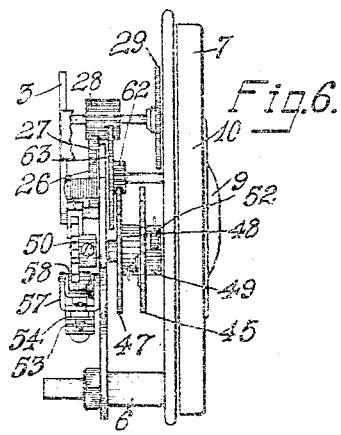
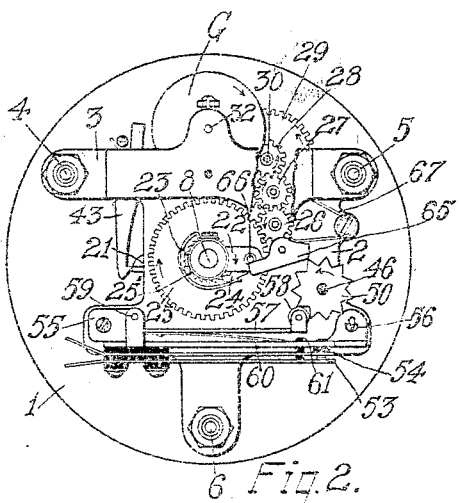
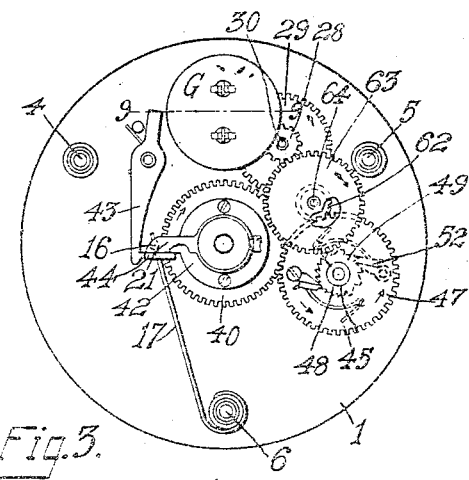
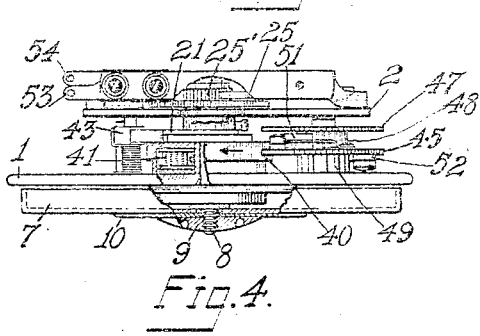
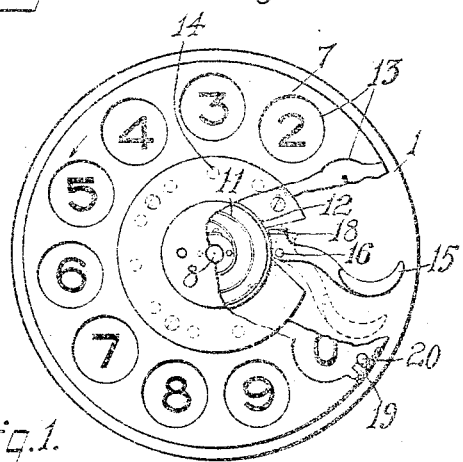
Witnesses
George E. Mueller
Wm Berghahn
Inventor
WILLIAM KAISLING
By Curtis B. Camp
Attorney

W. KAISLING.
CALLING DEVICE.
APPLICATION FILED JULY 9, 1910.

1,096,841.

Patented May 19, 1914.
3 SHEETS—SHEET 2.

Witnesses
George E. Mueller
Wm. Berghahn.

Inventor
William Kaisling
By Curtis B. Camp.
Attorney

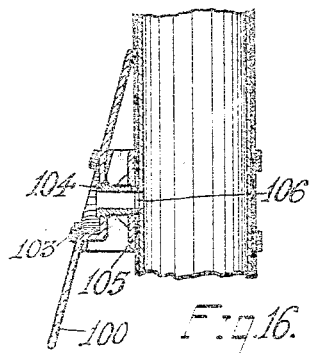
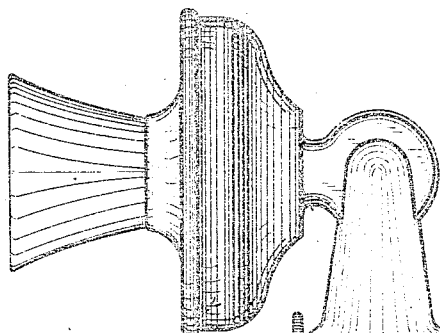
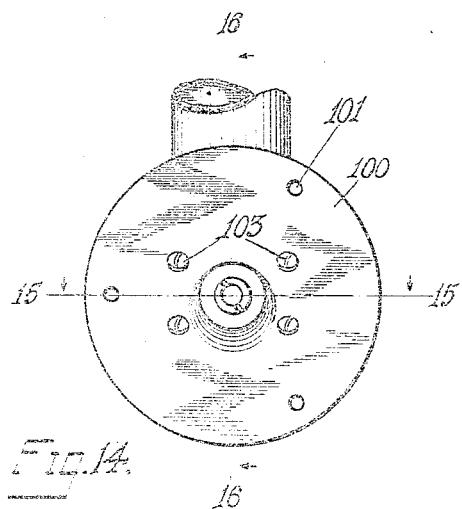
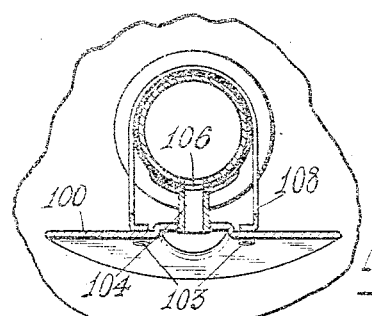

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

CALLING DEVICE.

1,096,841.  Specification of Letters Patent.  Patented May 19, 1914.

Application filed July 9, 1910. Serial No. 571,179.

*To all whom it may concern:*

Be it known that I, WILLIAM KAISLING, a citizen of the United States of America, residing in Chicago, county of Cook, and State of Illinois, have invented certain new and useful Improvements in Calling Devices, of which the following is a specification.

My invention relates to calling devices of the type commonly employed in automatic and semi-automatic telephone systems for the purpose of operating directively controlled associated switch mechanism.

My invention is particularly directed to devices for controlling switch mechanism over a circuit by actuating coöperative contact springs, the object being to provide a calling device of this sort which is simple in construction and most positive and efficient in operation.

One of the features of my invention consists in having a single mechanical movable stop adapted to coöperate with the dial so as to limit the movement of the said dial, corresponding to the selected finger-hold. Thus, I do not depend upon the contact between the finger and a fixed stop for limiting the movement of the dial.

Another feature is to provide mechanism adapted to be wound up or set by the forward movement of the dial, to then restore the dial and thereafter unlock the mechanism for transmitting impulses and hold the dial locked against further actuation until the impulses are transmitted. Thus, the dial is restored back to normal each time it is actuated by the finger. I also provide means whereby the dial after being operated is restored at a high speed under the influence of a governor and thereafter the impulse mechanism is operated at a relatively low speed under influence of the same governor, thereby gaining time by the quick return of the dial without the jar usually attendant where the dial is allowed to snap back.

There are many features and advantages in the structure herein described which will be better understood upon reference to the following detailed description taken in connection with the accompanying drawings, and the scope of the invention will be particularly pointed out in the appended claims.

Figure 12:
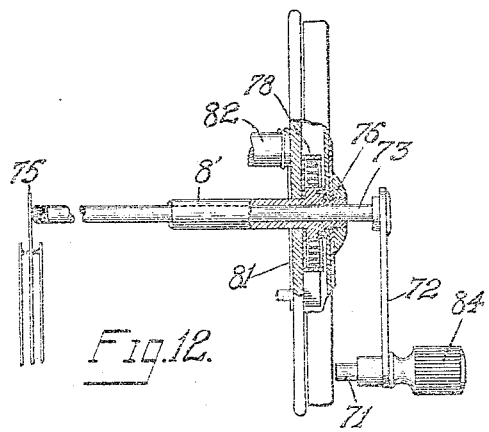
Figure 11:
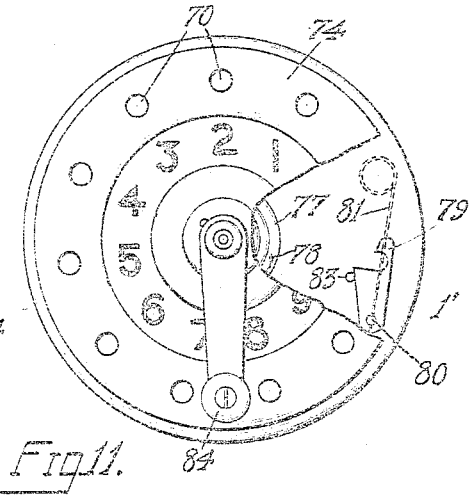
Figure 7:
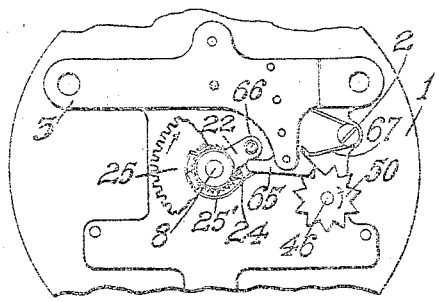
Figure 8:
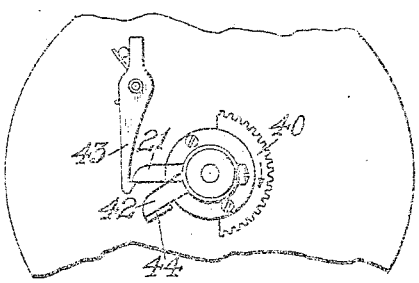
Figure 9:
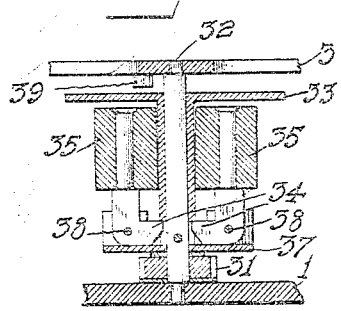
Figure 10:
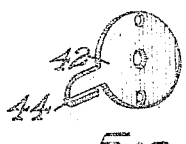

Referring to the accompanying drawing in which like reference characters indicate like parts, Figure 1 is a front view showing a dial of the calling device of my invention with part of the said dial broken away to show the movable mechanical stop which is adapted to coöperate with the finger in the finger-hold to limit the movement of the dial. Fig. 2 is a rear elevation of the structure shown in Fig. 1; Fig. 3 is a view similar to that of Fig. 2 except that the bridge plates and some of the mechanism have been removed to show some of the parts on the interior; Fig. 4 is a bottom view of the structure shown in Fig. 2; Fig. 5 is a top view of the structure shown in Fig. 2, leaving out some of the rear details; Fig. 6 is a right-hand elevation of Fig. 2 leaving out some of the details; Fig. 7 is a rear elevation showing only the main shaft moved off-normal and with the link stop 65 engaging the impulse wheel 50; Fig. 8 is a view showing the coöperation between the latch 43 and catch arm 21 of the dial shaft, the said mechanism comprising the means for locking the dial against actuation while the impulse mechanism is operating for transmitting impulses; Fig. 9 is a double scale section of the governor along the line 9—9 of Fig. 3; Fig. 10 is a perspective view of the unlatching arm; Fig. 11 is a front view of a modification of the dial shown in Fig. 1 and using a rotatable arm with a pin stop in place of the finger holds as used on the dial of Fig. 1; Fig. 12 is a left end elevation of the dial shown in Fig. 11, the said dial being adapted to operate in connection with the mechanism of the structure shown in Figs. 1 to 10, inclusive; Fig. 13 is a side elevation of a desk telephone showing the calling device secured to the standard thereof; Fig. 14 is a front elevation of the securing plate shown in Fig. 13 with the calling device removed; Fig. 15 is a cross-section along the line 15, 15 of Fig. 14 looking in the direction indicated by the arrow; and Fig. 16 is a vertical cross-section along the lines 16, 16 of Fig. 14, looking in the direction of the arrow.

Referring now more in detail to the structure shown in Figs. 1 to 10, the said structure comprises the main front plate 1, having the bridge plates 2 and 3 secured thereto by means of the separating studs 4, 5 and 6. The dial 7 is secured to the shaft 8 by means of the nut 9, the washer 10 being placed between the said dial 7 and the nut 9. The clock spring 11 has one end secured to the main shaft 8 and the other end secured to the inner side of the drum-plate 12. The said spring 11 is adapted to return the dial 7 to normal when it is actuated to set the impulse transmitting mechanism. The dial 7 has ten finger-holds 13 therein. For each finger-hold 13 there is a stop-pin 14 which is riveted to the dial 7. The lever-stop 15 is normally in the position shown by the full line, the said stop being pivoted by the pin 16 to the front plate 1. The pin 16 extends through the front plate 1 and has a spring 17 passed through a hole in the said pin, the other end of the spring 17 being wound around the separating stud 6. Thus, after the lever 15 has been actuated, it is restored to normal by the spring 17. When the dial 7 is actuated by means of the finger engaging one of the finger-holds 13, the finger engages the lever 15 and continuing in its movement, moves the lever to the position indicated by the dotted lines, bringing the stop 18 in engagement with a stop pin 14 of the selected finger-hold. The dial 7 is held in its normal position under tension of the spring 11, the pin 19 which is fixed to the said dial 7 engaging pin 20, which is fixed to the front plate 1.

Fastened to the main shaft 8 is the catch arm 21, the said arm 21 being movable with the main shaft 8 and the dial 7. The arm 22 is also secured to the main shaft 8 by means of the set screw 23. Pivoted to the arm 22 is the pawl 24, the said pawl engaging teeth in the ratchet wheel 25′, the said ratchet wheel being secured to the gear wheel 25. The gear wheel 25 is loose upon the main shaft 8, the said gear wheel connecting the main shaft to the governor G when the said shaft 8 and dial 7 are restored after being actuated. This connection between the gear 25 and governor G is as follows: The gear 25 is in mesh with the idler 26, the said idler 26 being in mesh with the idler 27. The idler 27 is in mesh with the pinion 28, the said pinion 28 and the gear wheel 29 being secured to the shaft 30. The gear 29 is in mesh with the pinion 31, the said pinion 31 being secured to the shaft 32 of the governor G. A small arrow is shown on each one of the gear wheels and pinions, the said arrow indicating the direction of rotation of the respective gears and pinions when the dial is restored to normal or the impulse transmitting mechanism is operating for transmitting impulses. When the dial 7 is actuated to set the impulse transmitting mechanism, it is rotated in a clock-wise direction and when the finger is withdrawn from the finger-hold, the dial is restored by the spring 11 under the influence of the governor G. The gear wheel 25 which is loose upon the shaft 8 remains stationary while the dial 7 is being moved forward, as the pawl 24 is free to move over the teeth of the ratchet wheel 25′, but when the dial is released to restore, the said arm 22 and pawl 24 move in the direction indicated by the arrow thereon, and the gear wheel 25 is carried along. The said gear wheel 25 being connected to the governor G as previously described, the dial is restored under influence of the said governor. The operation of the governor will be more fully understood by a reference to the Fig. 9 in which the main shaft is journaled between the front plate 1 and the bridge 3. The disk 33 with its sleeve is loose upon the shaft 32 and is held against the arms 34 of the weights 35 by means of the springs 36. The said arms 34 rest in a slot in the end of the sleeve of disk 33. The weights 35 are pivoted to the cross arm 37 by means of the pins 38, the said arm 37 being riveted to the main shaft 32. When the governor reaches a pre-determined speed, the weights 35 moving outward, force the disk 33 against the friction button 39.

The drum-gear 40 is loose upon the sleeve extension of the main plate 1 as shown in Fig. 4. Inside of the said drum is a clock-spring 41 having one end secured to the drum by means of a pin as shown in the cross-section, and the other end of the spring 41 is secured to the sleeve of the plate 1. Screwed to the drum-gear 40 is the unlatching arm 42, the said arm being adapted in the return of the drum 40 to disengage the latch 43 from the catch arm 21 as shown in Fig. 8. This unlatching arm 42 also serves as a stop for the gear drum 40, the bent portion 44 engaging the arm 21. Drum 40 is under tension of the spring 41 and the arm 42 being secured to the said drum 40, the said arm 42 rests against the catch arm 21, holding the drum 40 in normal position.

The gear 45 which is in mesh with the teeth of the drum-gear 40 is loose upon the shaft 46. The gear wheel 47 and the ratchet wheel 48 are secured together and are also loose upon the shaft 46. The ratchet wheel 49 is securely fastened to the shaft 46 as is also the star or impulse wheel 50. The ratchet wheel 49 and impulse wheel 50 each have eleven teeth. As shown in Fig. 4 the pawl 51 is pivoted to the upper side of the gear wheel 45 and the pawl 52 is pivoted to the lower side of the gear wheel 45. The pawl 51 is adapted to engage the teeth of the ratchet wheel 48 and the pawl 52 is adapted to engage the teeth of the ratchet wheel 49, the said pawls being held in engagement by their respective springs.

The impulse springs 53 and 54 are mounted on the bracket 55, the said bracket being secured at its left end to the bridge plate 2 by means of a screw and the right end of the mounting bracket is secured to the plate 2 by means of a screw 56 passing through a slot in the said plate 55. By means of this screw 56, the bracket may be adjusted, being moved toward or away from the impulse wheel 50 as desired, thereby adjusting the springs 53, 54. The arm 57 having the roller 58 journaled at one end is pivotally secured to the mounting bracket 55 by pin 59. The said arm 57 is held in engagement with the impulse wheel 50 due to the spring 60 which is riveted to the said arm 57, having its free end pressing against the bracket 55. Thus, when the impulse wheel 50 is rotated in the direction of the arrow shown thereon, the teeth of the said impulse wheel vibrate the arm 57, the said arm on each vibration engaging the insulating stud 61 which is fastened to the contact spring 53 and by this engagement opens the contact of the springs 53 and 54.

The gear drum 40 which is adapted to be rotated in a direction opposite to that indicated by the arrow thereon when the dial 7 is actuated by the finger, is also geared to the governor G so that when the said drum 40 restores, it does so under the influence of the said governor G. The geared connection from the drum 40 to the governor G is as follows: The teeth of the gear drum 40 are in mesh with the gear 45, the said gear 45, due to its connection with the ratchet wheel 48 by means of the pawl 51, being adapted to rotate the gear 47 when the said gear drum 40 is restoring. The gear wheel 47 is in mesh with the small pinion 62, the said pinion and the gear 63 being secured to the shaft 64. The gear wheel 63 is in mesh with the pinion 28, the said pinion 28 and the gear wheel 29 being both fastened to the shaft 30, the gear 29 being in mesh with the pinion 31 of the governor G as previously stated. Thus, it will be seen that when the gear-drum 40 is restored in the direction indicated by the arrow thereon, its movement is controlled by the governor G on account of the connections through the gears just described.

The link-stop 65 which is pivoted between the plates 2 and 3, is normally resting against the pin 66 on the arm 22 under tension of the spring 67. The other end of this link-stop 65 is normally out of engagement with the impulse wheel 50 as shown in Fig. 2, but when the dial is actuated the arm 22 and pin 66 are moved away from the link-stop as shown in Fig. 7, allowing the said stop 65 to engage a tooth of the impulse wheel 50. This prevents the operation or rotation of the impulse wheel 50 while the dial is restoring. When the dial has restored to normal, the said link 65 is engaged by the pin 66 and moved out of engagement with the said impulse wheel 50.

Having described in detail the construction of the device of Figs. 1 to 10, a description of the operation of the said calling device will now be entered into, and is as follows: Assuming the operator desires to open and close the contact springs 53 and 54 a single time, the finger is placed in the finger-hold No. 1 and the dial 7 is rotated in a clockwise direction until the finger contacts with the lever stop 15 and continuing in its movement, moves the said lever to the position shown by the dotted line and placing the projection 18 in a position to engage the stop-pin 14 corresponding to the selected finger-hold. The dial 7 is now actuated and the shaft 8 is carried with it as is also the arm 21, and the arm 22. The arm 22 is carried to the position shown in Fig. 7 and due to the pin 66 disengaging from the link-stop 65, the said link-stop moves into engagement with a tooth of the impulse wheel 50, locking the said wheel against movement until the pin 66 again unlocks the arm 65 in the return of the dial. The arm 21 which engages the flange 44 on the unlatching arm 42, carries the said arm 42 around when the dial is actuated. The drum gear 40 being secured to the arm 42, is also carried along with the said arm 42, thereby rotating the gear-wheel 45 in a direction reverse to that indicated by the arrow thereon, and the pawls 51 and 52 slide over the teeth of their respective ratchet wheels 48 and 49, the pawl 52 moving over one tooth as only one impulse is to be transmitted. If more than one impulse is to be transmitted the pawl 52 moves over a number of teeth in the ratchet wheel 49, corresponding to the number of impulses to be transmitted. The pawl 24 which is pivoted to the arm 22 also slides over the teeth of its ratchet wheel 25' without moving the gear wheel 25, when the dial is actuated. The dial 7 having been stopped, due to the stop 18 engaging a stop pin 14, the finger is withdrawn from the finger-hold and the dial is restored by the clock spring 11, the stops 19 and 20 again coming into engagement. As previously stated, the dial restores under the influence of the governor G, it being geared to the said governor as follows: The gear 25 is carried along with the shaft 8 in the restoration of the dial, due to the engagement of the pawl 24 with its ratchet wheel 25', and the gear 25 which is in mesh with the pinion 31 of the governor G through the two idlers 26 and 27, the pinion 28 and gear wheel 29 which are on the shaft 30. The drum-gear 40 does not restore with the dial, the arm 42 which is secured to gear 40; therefore of course also remaining in the position shown in Fig. 8, gear 40 being prevented from restoring on account of its being in mesh with the gear wheel 45, and the pawl 52 which is secured to the gear 45 is in engagement with a tooth of the ratchet wheel 49. The said ratchet wheel 49 and the impulse wheel 50 are fast to the shaft 46 and the said shaft is locked against rotation by the engagement of the impulse wheel 50 by the link 65 until the dial restores and the pin 66 moves the link stop 65 out of engagement with the said impulse wheel 50. Thus, it will be seen that the impulse mechanism is locked against actuation while the dial is off-normal, due to the engagement of the link-stop 65 with the wheel 50.

When the dial returns to normal, the arm 21 which is fastened to the shaft 8 is engaged by the latch 43, thus preventing another actuation of the dial until the said latch 43 has been disengaged from the arm 21. The dial having returned to normal, the arm 21 is engaged by the latch 43 as shown in Fig. 8. The arm 22 is in the position shown in Fig. 2 with the link stop 65 moved out of engagement with the wheel 50. The drum gear 40 and the arm 42 having been moved to the position shown in Fig. 8 by the actuation of the dial 7, are free to return to normal as soon as the link stop 65 disengages from the impulse wheel 50. Therefore, the link stop 65 having been moved out of engagement with the wheel 50, the said drum 40 starts to restore by means of the spring 41 which is within the said drum. The gear wheel 45 being in mesh with the gear 40, rotates in a direction indicated by the arrow thereon, as shown in Fig. 3. The pawl 52 being fastened to the gear 45 carries the ratchet wheel 49 around with it, thereby rotating the shaft 46 and the impulse wheel 50, and moving one tooth of the said wheel 50 past the roller 58. This causes the arm 57 to engage the buffer 61 a single time, opening and closing the contact springs 53 and 54 a single time. The gear drum 40 in its restoration to operate the impulse springs is influenced by the governor G, it being connected to the said governor through the gear wheel 47 which is carried around by the pawl 51, the said gear 47 being in mesh with the pinion 62. The said pinion 62 and the gear 63 are fastened to the same shaft and are geared to the governor through the pinion 28 and the gear wheel 29 to the pinion 31. As previously stated, the dial when restored is locked against actuation while the impulse transmitting mechanism is operating, and until the drum 40 has restored to normal, the said drum 40 carrying the unlatching arm 42 back with it. The arm 42 in its restoration engages the latch 43 moving it out of engagement with the catch arm 21. Thus, it will be seen that it will be impossible to again actuate the dial 7 until the impulse transmitting mechanism is operated and restored to normal after transmitting the impulse.

It will be noticed that the shaft 8 is geared to the governor through the gear 25, the idlers 26 and 27, pinion 28 and gear 29, while the gear drum 40 and shaft 46 are geared to the governor through the extra pinion 64 and gear 63. By this difference in gearing and the arrangement of the ratchets and pawls, the dial 7 is restored at a relatively high speed while the impulse wheel 50 is operated at a relatively slow speed.

It is obvious that other means may be used to set the mechanism of the impulse transmitter of Figs. 1 to 10 than the dial with the finger-holds as shown in Fig. 1. In Figs. 11 and 12 I show a dial which is adapted to be used with the mechanism of Figs. 1 to 10 in place of the dial 7 and the stop 15 with only a few slight changes in the mechanism. Fig. 11 is a front view of a modified dial having a series of holes 70 in the face thereof, these holes being adapted to be engaged by the pin 71 of the arms 72, the said arm being secured to the shaft 73. The said shaft 73 is free to rotate within the hollow shaft 8', the said pin 71 being held clear of the dial 74 due to the spring 75 pressing against the insulated end. The dial 74 is fastened to the shaft 8' by means of the nut 76 in a manner similar to that of the dial 7 in Fig. 4. The spring 77 has one end fastened to the drum 78 and its other end to the shaft 8', this spring serving to restore the dial when it is actuated. The catch 79 is pivoted to the front plate 1' by means of the stud 80, the said stud passing through the front plate 1' and having the spring 81 passing therethrough in a manner similar to that described in connection with the pin 16 of Fig. 3. The other end of the spring 81 is wound around the separating stud 82 as shown in Fig. 12. This spring 81 serves to hold the catch 79 against the stop-pin 83.

To use the dial of Figs. 11 and 12 in place of the dial 7, it is only necessary to use a hollow shaft 8' in place of the shaft 8, and a few other slight changes which are obvious in view of the drawings.

To operate the dial of Figs. 11 and 12, the handle 84 is moved around and the pin 71 inserted into the hole 70, corresponding to the number of impulses which it is desired to transmit. The handle 84 is then rotated carrying the dial along in a clockwise direction until the pin 71 engages the catch 79 when the further movement of the dial is stopped. Thus, it will be seen that the dial 74 will be held in this position until the pin 71 is withdrawn from its engaging hole, when the dial 74 is free to restore under influence of the spring 77. It is obvious that if the mechanism were connected to the shaft 8' in a manner similar to that in which it is connected to the shaft 8, the impulse transmitting mechanism would be wound up and locked as described in connection with the Figs. 1 to 10. When the dial 74 would restore the mechanism would be unlocked and would then operate for transmitting impulses.

Figs. 13 to 16 show the means for securing the calling device to a desk stand. The plate 100 is adapted to receive the calling device by means of screws passing through the holes 101 and into the studs 4, 5 and 6. The ring 102 is adapted to be clamped between the plates 1 and 100 to inclose the mechanism of the calling device. The band 108 is secured to the plate 100 by means of the screws 103. The said plate 100 is counter-sunk at an angle as shown in Fig. 16 and has a screw stud 104 threaded therein and engaging the washer 105. The screw stud 104 has a hole therethrough and is adapted to receive the connections from the contact springs of the calling device to pass therethrough and into the hole 106 of the stand of the desk telephone. The bracket is clamped to the desk stand by means of the screw 104 and washer 105. It will be seen that by the use of this clamping bracket it would be very convenient to remove the calling device from the desk telephone for repairs and replace it by another one, by simply removing the screws 107.

What I claim as new and desire to secure by Letters Patent is:

1. In a calling device, the combination with a movable member, of a finger-hold for actuating said member, a stop movable with said member, a movable lever, said lever being adapted to be engaged and moved by the finger to coöperate with said stop to limit the movement of said member when said member is actuated, and means effective without necessitating the removal of the finger from the finger hold for thereafter restoring said member.

2. In a calling device, the combination with a movable member, of a finger-hold for actuating said member, a stop for said finger-hold, a movable lever, said lever being adapted to be engaged and moved by the finger when said member is actuated, means actuated responsive to the movement of said lever to engage said stop to limit the movement of said member, and means for thereafter restoring said member effective without necessitating the removal of the finger from the finger hold.

3. In a calling device, the combination with a movable member, of a series of finger-holds for actuating said member, a stop for each of said finger-holds, a movable lever, said lever being adapted to be engaged and moved by the finger when said member is actuated, means actuated responsive to the movement of said lever to engage a stop corresponding to the selected finger-hold to limit the movement of said member, and means for thereafter restoring said member effective without necessitating the removal of the finger from the finger hold.

4. In a calling device, the combination with a movable member, of a finger-hold for actuating said member, a movable lever, said lever being adapted to be engaged and moved by the finger when said member is actuated, means actuated responsive to the movement of said lever to limit the movement of said member, and means for thereafter restoring said member effective without necessitating the removal of the finger from the finger hold.

5. In a calling device, the combination with a movable member, of a series of finger-holds for actuating said member, a stop for each of said finger-holds, a movable lever, said lever being adapted to be engaged and moved by the finger when said member is actuated, means actuated responsive to the movement of said lever, whereby the movement of said member is limited corresponding to the selected finger-hold, and means for thereafter restoring said member effective without necessitating the removal of the finger from the finger hold.

6. In a calling device, the combination with a revoluble dial having a series of finger-holds adapted to be engaged by the finger of the operator when used, of a stop for each finger-hold, a movable lever, said lever being adapted to be moved by the finger when the dial is operated, said lever engaging a stop corresponding to the selected finger-hold, and means for thereafter restoring said member effective without necessitating the removal of the finger from the finger hold.

7. In a calling device, the combination with a movable member, of a finger-hold for actuating said member. impulse transmitting mechanism adapted to be adjusted for operation responsive to the movement of said member, means actuated by engagement with the finger in the finger-hold to limit the movement of said member, means for restoring said member, and means actuated upon restoration of said member, whereby said mechanism is subsequently operated.

8. In a calling device, the combination with a movable member, of a series of finger-holds for actuating said member, impulse transmitting mechanism adapted to be adjusted for operation responsive to the movement of said member, means actuated by engagement with the finger in a finger-hold to limit the movement of said member corresponding to the selected hold, means for restoring said member, and means actuated upon restoration of said member, whereby said mechanism is subsequently operated 9. In a calling device, the combination with a movable member, of a series of finger-holds for actuating said member, impulse transmitting mechanism adapted to be adjusted for operation responsive to the movement of said member, means for limiting the movement of said member corresponding to the selected hold, means for restoring said member, and means actuated upon restoration of said member whereby said mechanism is subsequently operated.

10. In a calling device, the combination with a movable member, of a series of finger-holds for actuating said member, mechanism adapted to be adjusted for operation responsive to the movement of said member, coöperating contacts, means actuated by engagement with the finger in a finger-hold to limit the movement of said member, means for restoring said member, and means actuated upon restoration of said member to subsequently operate said mechanism whereby said contacts coöperate corresponding to the selected finger-hold.

11. In a calling device, the combination with a member adapted to be moved to a plurality of different positions, of means for stopping said member when moved, in any one of its positions, impulse transmitting mechanism adapted to be adjusted for operation responsive to the movement of said member, means for restoring said member, and means actuated upon restoration of said member, whereby said mechanism is subsequently operated.

12. In a calling device, the combination with a movable member, of a series of finger-holds for actuating said member, mechanism adapted to be set for operation responsive to the movement of said member, coöperative contacts, means actuated by engagement with the finger in a finger-hold to limit the movement of said member, means for restoring said member, means actuated responsive to the restoration of said member to operate said mechanism, whereby said contacts coöperate corresponding to the selected finger-hold, and means to lock said member against actuation while said contacts are coöperating.

13. A calling device comprising a movable member having a plurality of adjacent finger-holds, mechanism adjusted responsive to movement of said member for transmitting impulses, means for restoring said member and thereafter operating said mechanism for transmitting impulses corresponding to the selected finger-hold, and means for locking said member while said mechanism is operating for transmitting impulses.

14. In a calling device, the combination with a manually operated movable member, of mechanism adjusted for transmitting impulses responsive to movement of said member, a speed governor, means for restoring said member at a relatively high speed under influence of said governor, after said mechanism is adjusted, and means for thereafter operating said mechanism at a relatively slow speed for transmitting impulses under influence of said governor.

15. In a calling device, the combination with a manually operated movable member, of mechanism adjusted for transmitting impulses responsive to movement of said member, means for restoring said member at a relatively high speed after said mechanism is adjusted, and means for thereafter operating said mechanism at a relatively slow speed for transmitting impulses.

16. A mounting device for impulse transmitters comprising a main securing plate a U-shaped band secured to said plate and adapted to encircle the standard of a desk telephone, and a clamping screw threaded into said main plate and adapted to engage said standard to hold said main plate in position.

17. In a calling device, the combination with a movable member, of a finger hold for actuating said member, a stop for said member, a finger lever adapted to be engaged and moved by the finger to coöperate with said stop to limit the movement of said member when actuated and means for thereafter simultaneously starting the restoration of said member and finger lever.

18. In a calling device, the combination with a movable member, of a series of finger holds for actuating said member, impulse mechanism adapted to be adjusted for operation responsive to a movement of said member, means actuated by engagement with the finger in a finger hold to limit the movement of said member corresponding to the selected finger hold, a catch for locking said mechanism in its adjusted position, means for restoring said member, and means actuated by the restoration of said member, to unlock said mechanism to operate.

19. A calling device comprising a movable setting member having a plurality of finger holds for the actuation thereof, a stop for each of said finger holds, means for restoring said setting member when actuated, a finger lever adapted to be engaged by the finger when in a selected finger hold and adapted to coöperate with said stops to limit the forward movement of the setting member according to the selected hold, said stops and finger lever being so coöperative whereby the restoring means for said setting member is made effective without necessitating the removal of the finger from the finger hold.

Signed by me at Chicago, county of Cook, and State of Illinois, in the presence of two witnesses.

WILLIAM KAISLING.

Witnesses:
 WM. BERGHAHN,
 MARJORIE E. GRIER.